March 29, 1938.  F. POVANDRA  2,112,786

VEHICLE SPRING

Filed Sept. 11, 1936

Frank Povandra
INVENTOR

BY Victor J. Evans & Co.
ATTORNEYS

Patented Mar. 29, 1938

2,112,786

UNITED STATES PATENT OFFICE 2,112,786

VEHICLE SPRING

Frank Povandra, Deadwood, S. Dak.

Application September 11, 1936, Serial No. 100,334

1 Claim. (Cl. 267—19)

The invention relates to vehicle springs and more especially to a vehicle spring connection.

The primary object of the invention is the provision of a spring or connection of this character, wherein through the use of a saddle and linkage a multiple spring can be mounted between the wheel axle and the body of a vehicle so that road inequalities in the travel of the vehicle will not disturb the body of the vehicle as shocks and jars incident to such travel will be absorbed and relieved from the body of the said vehicle, the assembly including the spring and the linkage as well as the saddle being novel and capable of fitting between the body and the wheel axle of a vehicle to function as a shock absorber.

A further object of the invention is the provision of a spring or connection of this character, wherein in the use thereof vertical oscillation as well as other vibrations will be reduced to a minimum with respect to the body of a vehicle and the latter will be sustained on substantially the same level without regard to irregularities or road inequalities upon which the vehicle is traveling.

A still further object of the invention is the provision of a spring or connection of this character, which is comparatively simple in construction, thoroughly reliable and effective in its operation, unique in the assembly thereof, strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing.

Similar reference characters indicate corresponding parts throughout the several views in the drawing.

Figure 1:
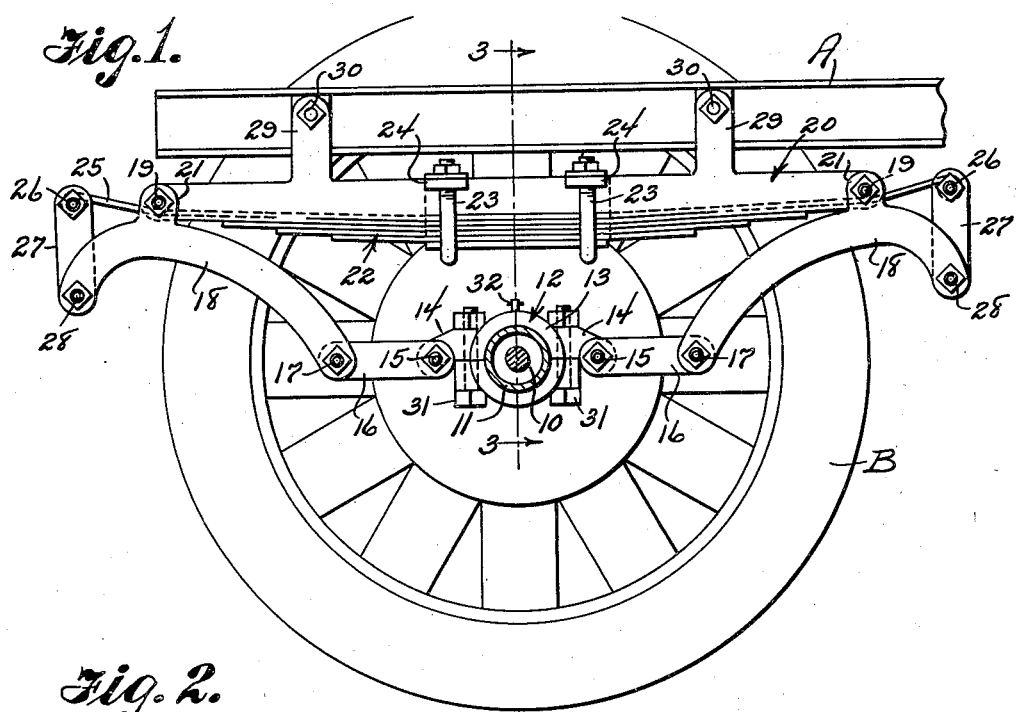
Figure 1 is a side elevation partly in section showing the spring or connection constructed in accordance with the invention applied to a vehicle.
Figure 2:
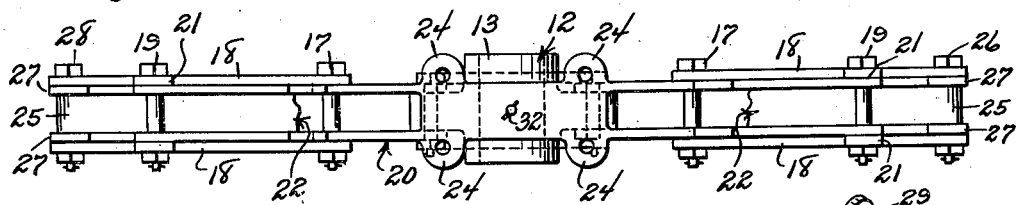
Figure 2 is a plan view partly broken away of such spring or connection and removed from the chassis of the vehicle.
Figure 3:
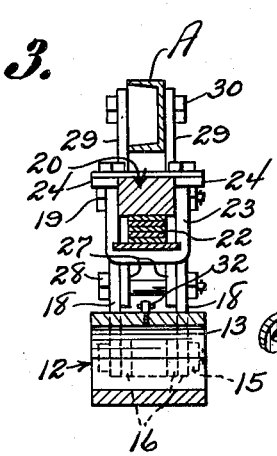
Figure 3 is a sectional view on the line 3—3 of Figure 1 looking in the direction of the arrows.
Figure 4:
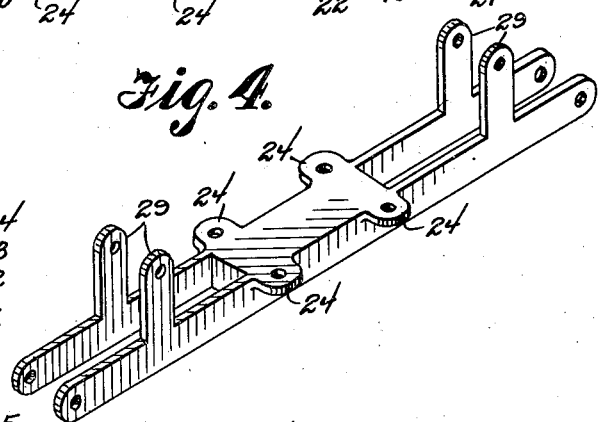
Figure 4 is a perspective view of a saddle used with the spring.

Referring to the drawing in detail, A designates generally a portion of the side sill of the chassis of a vehicle, B a wheel having its journal 10 fitted within a housing 11 accommodated by a split bearing 12, the part 13 of this bearing being formed with end eyes 14. Swingingly connected to the eyes 14 by pivots 15 are short links 16, these being pivoted at 17 to upwardly curved rocking levers 18. The levers have rocking movement and are pivoted at 19 to a saddle 20, the said levers 18 being formed with the pivot ears 21 for the pivots 19.

The saddle is superimposed with relation to a multiple leaf spring 22 which through clips 23 is fastened intermediate thereof to the saddle 20, these clips 23 being spaced from each other at the intermediate portion of the spring 22 and are fastened in ears 24 formed on and extended laterally from the saddle 20.

The uppermost longer spring leaf 25 has pivotal connection 26 with shackles 27 which are pivoted at 28 to the outer ends of the rocking levers 18.

The saddle 20 has upstanding therefrom attaching extensions 29 which through the use of bolts 30 are made secure to the sill A at opposite sides thereof, these extensions 29 being removed from the ends of the saddle 20.

The split parts of the bearing 12 are separably joined with each other through nut carrying bolts 31 and such parts of said bearing embrace the housing 11 for the axle 10 constituting the journal for the wheel B.

The part 13 of the bearing at its uppermost point has fitted therewith a lubricating nipple 32 for lubrication of the journal 10.

The saddle 20 is a casting and the spring 22 has its leaves gradually decreasing in length downwardly with the longer leaf uppermost and next to the saddle 20. The levers 18 project the shackles 27 beyond opposite ends of the saddle 20 and normally the leaf 25 of the spring 22 has contact with the pivots 19 connecting the levers 18 with the saddle as such leaf of the spring 25 underlies these pivotal points 19. The spring in reality is a floating spring and the assembly as hereinbefore stated relieves vertical shocks and jars to the chassis A of the vehicle when the latter is traveling and the wheels contact with inequalities in the road bed and the body of the vehicle is maintained substantially in the same level at all times notwithstanding such inequalities.

What is claimed is:

A spring connection for a vehicle having a chassis, a wheel and an axle housing, comprising a saddle having spaced upstanding extensions secured to the chassis, a multiple leaf spring fixed intermediate thereof to the saddle and having its ends extended beyond opposite ends of the saddle, the saddle being superimposed upon the spring, a bearing embracing the housing and having ears at opposite sides of the latter, upwardly arched levers pivoted eccentrically to opposite ends of said saddle at opposite sides thereof, links swingingly connected to the extended ends of the spring and to said levers at their ends next thereto, and links pivoted to the ears of said bearing and to the ends of the levers next thereto, the spring being susceptible of flexing action outwardly with respect to the attachment intermediate thereof with the said saddle.

FRANK POVANDRA.